March 4, 1969 J. V. MAJEWSKI 3,431,539
CABLE JUNCTION
Filed Dec. 6, 1966
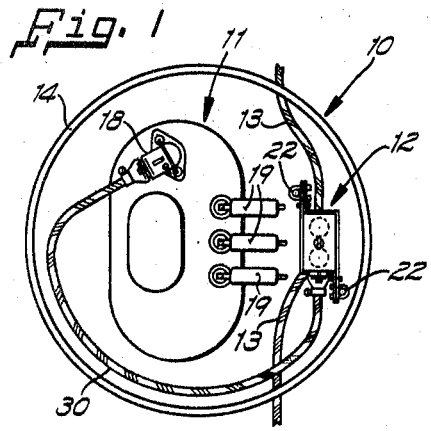
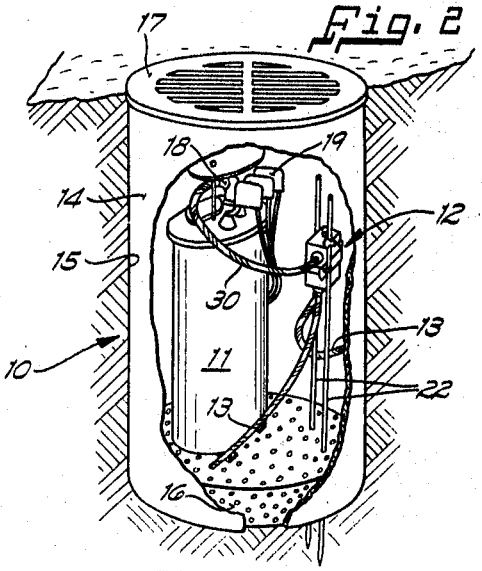
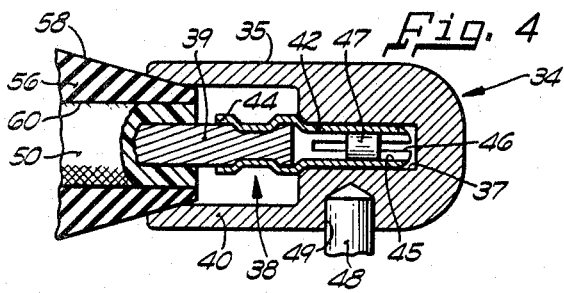
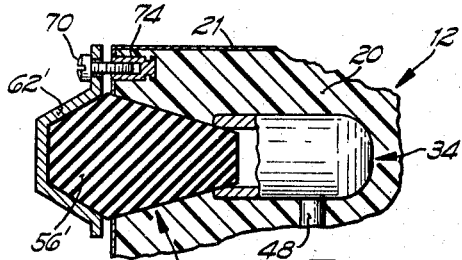
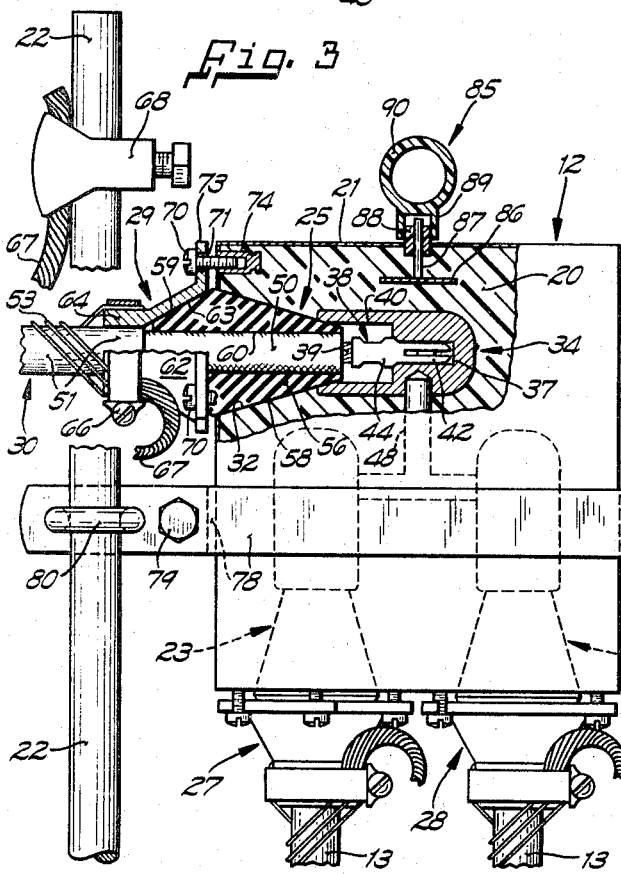
INVENTOR.
John V. Majewski
BY Fred Wirrott
ATTORNEY

# United States Patent Office 3,431,539
Patented Mar. 4, 1969

3,431,539
CABLE JUNCTION
John V. Majewski, Hales Corners, Wis., assignor to McGraw-Edison Company, Milwaukee, Wis., a corporation of Delaware
Filed Dec. 6, 1966, Ser. No. 599,499
U.S. Cl. 339—103        8 Claims
Int. Cl. H01r 13/58, 13/46, 9/22

ABSTRACT OF THE DISCLOSURE

A transformer housed below ground has, supported adjacent thereto, a cable junction comprising a block of insulation coated with conductive paint and having shielding pin socket contacts embedded therein and integrally joined together. Cable end terminals are inserted in the contacts, and are secured by a gland which is compressed about each cable end. A plug having the general dimensions of a gland seals an unused socket contact opening.

---

This invention relates to underground distribution systems and, more particularly, to a cable junction for use in underground systems.

Underground electrical distribution systems generally include a high voltage conductor which supplies energy to a number of stepdown transformers which, in turn, deliver low voltage energy to widely spaced points of useage. The primary conductor of such systems comprises a buried cable, and the transformers are located in vaults disposed below ground. The transformers of such prior art systems were generally provided with two high voltage bushings which were connected directly into the primary cable. In such systems it was the general practice to incorporate various auxiliary equipment into the transformer so that a large variety of transformer units were required to satisfy the various needs at different locations within the system.

Brief summary of the invention

In general terms the invention comprises a cable junction for interconnecting a plurality of high voltage electrical cables and including a body of insulating material having a conductive outer surface means and a plurality of receptacles provided therein. One of a plurality of electrically connected terminal members are provided at the inner end of each receptacle and each includes a first connector. The invention also includes a high voltage cable termination means associated with each receptacle and each including a second connector on the cable conductor and an insulating gland member surrounding the cable insulation and having a first surface complementary to the receptacle and a substantially frustoconical surface. A frustoconical stress relief member is attached at its small diameter end to the cable and at its large diameter end to the insulating body.

It is an object of the invention to provide a new and improved cable junction which permits the use of a standard transformer in underground systems.

Another object of the invention is to provide a cable junction for underground systems which may be quickly converted into a cable splice.

A further object of the invention is to provide a cable junction which may be mounted independently of the transformer of underground systems.

These and other objects and advantages of the instant invention will become more apparent from the detailed description thereof, taken with the accompanying drawings in which:

FIG. 1 is a plan view of an underground distribution system vault incorporating the instant invention;

FIG. 2 is a perspective view, with parts broken away, of the vault illustrated in FIG. 1;

FIG. 3 is a side elevational view, with parts broken away, of the junction according to the instant invention;

FIG. 4 is an enlarged fragmentary view of a portion of the junction shown in FIG. 3; and FIG. 5 is a view illustrating how the junction of FIG. 3 may be altered to provide a cable splice.

Referring to the drawings in greater detail, FIGS. 1 and 2 show the vault 10 of an underground distribution system for enclosing a transformer 11 and a junction 12 for connecting the transformer 11 to a high voltage primary conductor 13. It will be understood that a plurality of such vaults 10 will be located throughout the system with the primary conductor connected at one end to a source of power if the system is radial or at both ends if part of a loop system.

FIG. 2 shows the vault 10 in greater detail to include a generally tubular open-ended vault member 14 composed of any suitable material, such as bituminous fiber, and which is disposed in a prepared excavated opening 15. The floor of the vault 10 may be covered with gravel 16 for supporting the transformer 11 independently of the vault member 14. A grate 17 covers the exposed upper end of the vault member 14 to provide ventilation and prevent tampering. The high voltage bushing 18 of transformer 11 is connected to the junction 12 by transformer lead 30, while the secondary bushings 19 are connected to a load circuit by conductors (not shown).

FIGS. 2 and 3 illustrate that the cable junction 12 may comprise a rectilinear body of insulating material 20, such as epoxy, which may be coated by a conductive paint 21. Ground rods 22 driven into the floor of vault 10 support the junction 12 independently of the transformer 11 and the vault member 15. The junction 12 is preferably provided with three connector receptacles 23, 24 and 25 for respectively receiving cable terminating connectors 27, 28 and 29.

While the receptacles 23, 24 and 25 may be arranged in any convenient manner, in the preferred embodiment of the invention illustrated in FIG. 3 the receptacles 23 and 24 are disposed in the lower end of junction 12 and their respective connectors 27 and 28 are preferably connected to the primary cable 13. In addition, the receptacle 25 is disposed in one side of the junction 12 and its respective connector 29 is connected to the transformer lead 30. Each of the receptacles 23, 24 and 25 and their respective cable terminating connectors 27, 28 and 29 are identical so that only receptacle 25 and connector 29 will be discussed in detail for the sake of brevity.

Receptacle 25 has a generally frustoconical entrance surface 32 formed in the body 20 and a conductive metallic terminal member 34 embedded in said body at the inner, small diameter end of the surface 32. The terminal member 34 has a generally cylindrical outer surface 35 and an axial bore 37 for receiving a complementary bayonet connector member 38 which is affixed to the cable conductor 39.

Terminal 34 is shown in FIGS. 3 and 4 to also include a generally tubular shield portion 40 which extends backwardly in surrounding relation to the connector member 38 and terminates in the small diameter end of the surface 32. It will be appreciated that the shield portion 40 will be at the same potential as the cable conductor 39 and the connector member 38. As a result, the air surrounding these members will not be electrically stressed and will, therefore, not be ionized or give rise to radio noise voltage or generate corona which would initiate deterioration of the insulation.

The bayonet connector member 38 has an elongate, cylindrical connector portion 42 which is adapted to slideably fit within the bore 37 of the terminal member 34 and a larger diameter sleeve portion 44 which is received over and crimped to the end of the cable conductor 39. The connector portion 42 has an axial bore 45 and is split longitudinally at diametrically opposite points 46. A pin 47, of slightly larger diameter than the bore 45, is disposed within said bore and urges the split portions of the connector portion 42 outwardly into high pressure engagement with the bore 37.

The various terminal members 34 of the receptacles 23, 24 and 25 are electrically interconnected by means of a generally T-shaped metallic conductive member 48, each leg of which is received in an opening 49 formed transversely through the outer surface 35 of each of the members 34. Those skilled in the art will appreciate that the member 48 may be suitably affixed in the openings 49 of each of the members 34 in any suitable manner, such as by brazing, prior to the time that the members 34 are embedded into the body 20.

As seen in FIG. 3, the transformer lead 30, which terminates at the connector 25, includes the inner conductor 39 which is surrounded by insulation 50 and an outer conductive layer, or sheath, 51 which is in turn surrounded by a plurality of metallic conductive neutral strands 53. The cable 30 is terminated at the connector 29 by laying back the neutral strands 53 and thereafter removing a terminal portion of the conductive sheaths 51 and a portion of the insulation 50 to expose the inner conductor 39. Thereafter, a length of the conductive layer 51 is removed from the cable insulating material 50.

The connector 29 also includes a gland member 56 of substantially noncompressible resilient insulating material which has frustoconical surfaces 58 and 59 facing in each axial direction and an axial bore 60 which fits over the cable insulating sheath 50 from which the conductive outer layer 51 has been removed. The bore 60 is of such a dimension with respect to the diameter of the cable insulation 50 that a slight interference fit is effective as it is axially pressed into place about the cable end.

The connector 29 also includes a hollow metallic conductive stress relief member 62 whose inner surface 63 is complementary to the frustoconical surface 59 on the gland member 56. A tubular extension 64 is formed on the member 62 for being received over the conductive coating 51 on cable 30. A compression-type clamp 66 surrounds the tubular extension 64 to secure the neutral strands 53 to the stress relief member 62 and also to urge the tubular extension 64 against the conductive coating 51. The neutral strands 53 are also twisted into a pigtail 67 which may be secured to one of the ground rods 22 by a clamp 68.

The stress relief member 62 is secured to the body member 20 by a plurality of screws 70 which extends through suitable openings 71 formed in each of a plurality of ears 73 spaced around the periphery of the large diameter end of member 62 and which threadably engage metallic insert member 74 embedded in the member 20. Tightening of the screws 70 forces the stress relief member 62 into high pressure engagement with the gland 56 which, in turn, forces the gland surface 58 against the receptacle surface 32. Because gland 56 is resilient, the high pressure engagement between the surfaces 32 and 58, low dielectric strength voids, or air pockets therebetween are eliminated.

The junction 12 is supported by a conductive metallic strap 78 consisting of two identical halves which are disposed around the connector 12 in an opposed relation and are joined by means of bolts 79. A pair of U-bolts 80 affix the strap 78 to the ground rods 22. The strap 78 also serves to complete the ground connection between the coating 21 and the ground rods 22.

The junction 12 may also include a test tap 85 which is formed by embedding a small metallic plate 86 in the body 20 and which has a metallic probe 87 extending outwardly through the surface of the body 20 and whose outer end is surrounded by an insulating collar portion 88. The metal plate provides a limited capacitive coupling with the terminal members 34 and the exposed end of the probe 87 affords a terminal which may be checked with appropriate instruments to determine whether the junction is energized. An insulating protective cap 89 normally fits over the collar 88 for enclosing the end of probe 87 and is provided with an eye 90 so that it may be removed with a hook stick.

FIG. 5 illustrates how the junction 12, according to the instant invention, may be employed as a cable splice in a vault wherein a transformer will eventually be required but in which the present needs of the system do not require its immediate installation. Under such circumstances, it is normal practice to prepare an excavation and install a vault member 14 so that power equipment need not return to the site at a later date. Here the receptacle 25, which would normally receive the transformer lead 30, is plugged by a solid frustoconical double-ended gland member 56' which is secured to the body 20 by a mating cap member 62'.

While only a single embodiment of the invention has been shown and described, other modifications will be apparent to those skilled in the art once applicant's invention is known. In addition, while the junction has been illustrated with respect to three receptacles, it will be apparent that it may be arranged with any convenient number.

I claim:

1. A cable junction for use in a below grade vault for interconnecting a plurality of high voltage electrical cables at least one of which extends through the wall of said vault and is buried, each of said cables having a central conductor surrounded by insulation and an outer conductive layer wherein the terminal end of each of said cables has the insulation and conductive outer layer removed from a first portion back from the terminal end thereof and the conductive outer layer removed from a second portion back from said first portion, said cable junction comprising a body of insulating material, conductive means disposed on the surface of said material, a plurality of receptacles provided in said junction and each including a recess formed in said insulating material and intersecting the surface thereof, each of said receptacles also including a terminal means disposed within said insulating material and at the inner end of its respective recess and being insulated from said conductive means by said insulating material, each of said terminal means having an opening formed therein which is coaxial with and opens into said recess, each of said terminal means also including a first connector disposed in said opening, conductive means for electrically interconnecting each of said terminal members, said junction also including a high voltage cable termination means associated with each receptacle and each including a second connector mounted on the first portion of said cable and an insulating gland member surrounding the insulation on the second portion of said cable, said insulating gland member having a pair of axially extending surfaces, one of said surfaces being complementary to said recess and the other of said surfaces being substantially frustoconical, a conductive stress relief member for each of said terminating means and including an inner surface complementary to the frustoconical surface on said gland member, first means for attaching the small diameter end of said stress relief means to said cable and second means for affixing the large diameter end of said stress relief means to said insulating body, said second means acting to compress said insulating gland between said stress relief means and said recess to eliminate low dielectric strength air gaps between said recess and the first surface of said gland.

2. The cable junction set forth in claim 1 wherein said connector includes at least three receptacles and three cable termination means.

3. The cable junction set forth in claim 2 wherein two cable termination means are disposed in two of said receptacles and a third receptacle is filled by a complementary solid insulating gland member.

4. The cable junction set forth in claim 1 wherein each of said recesses defines a frustoconical surface whose large diameter end lies at the surface of said body, said one axial gland surface being complementary to the surface of said recesses.

5. The cable junction set forth in claim 1 wherein each of said terminal means includes shield means disposed in surrounding relation to said first and second connectors when said cable terminations are disposed in said receptacles, said shield means being electrically connected to said connectors so that the air surrounding said connectors will not be stressed electrically.

6. The cable junction set forth in claim 5 wherein said first connector comprises an axial bore in said terminal means, and said second connector comprises an elongate member attached to and extending axially from the terminal end of said conductor.

7. The cable junction set forth in claim 6 wherein said connector includes at least three receptacles and three cable termination means, and wherein each of said recesses defines a frustoconical surface whose large diameter end lies at the surface of said body, said one axial gland surface being complementary to the surface of said recess.

8. The cable junction set forth in claim 7 in combination with a transformer disposed in said vault and having a single high voltage bushing, another one of said cables extending from said high voltage bushing to one of said cable terminations.

References Cited

UNITED STATES PATENTS

| | | | |
|---|---|---|---|
| 2,917,724 | 12/1959 | Jackson | 339—198 |
| 2,925,459 | 2/1960 | Priaroggia | 174—73 |
| 3,323,097 | 5/1967 | Tordoff | 339—143 X |
| 3,337,833 | 8/1967 | Creedon | 339—14 |
| 3,377,478 | 4/1968 | McNulty | 174—37 X |

RICHARD E. MOORE, *Primary Examiner.*

U.S. Cl. X.R.

339—136, 198